United States Patent
Kemp et al.

(10) Patent No.: US 7,556,552 B1
(45) Date of Patent: Jul. 7, 2009

(54) SOLITARY BEE EMERGENCE BOX

(75) Inventors: William P. Kemp, Fargo, ND (US);
Glen E. Trostle, Logan, UT (US);
Theresa L. Pitts-Singer, Millville, UT (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 218 days.

(21) Appl. No.: 11/823,647

(22) Filed: Jun. 28, 2007

(51) Int. Cl.
*A01K 47/00* (2006.01)
(52) U.S. Cl. .................... 449/1; 449/4; 449/27
(58) Field of Classification Search ............ 449/1, 449/2, 4, 8, 12, 19, 23, 26, 27, 50
See application file for complete search history.

(56) References Cited

U.S. PATENT DOCUMENTS 3,438,070 A * 4/1969 Florance .................. 449/2
3,468,289 A * 9/1969 Broida .................. 119/6.5
6,364,738 B1 4/2002 Kendell
2007/0218804 A1 9/2007 Allan

* cited by examiner

*Primary Examiner*—Rob Swiatek
(74) *Attorney, Agent, or Firm*—John Fado; Randall E. Deck; Lesley Shaw

(57) ABSTRACT

Incubation and emergence of solitary-nesting pollinating bees from their nests or cocoons under field conditions may be effected using a device including a first outer and second inner hollow containers wherein a nest containing the bees may be disposed, and first and second communicating openings are provided on the lower surfaces of the containers to provide access to the environment from the nest in the inner container. To allow egress of bees from the nests to the environment while inhibiting or preventing their return, a one-way exit is provided in communication with the second opening, which is also attached to or extends through the first opening. Controlled heating of the nests are effected by disposing a heating element within the outer container, external of the inner container. A temperature controller for the heating element and an electrical power source for providing power thereto are also provided.

23 Claims, 7 Drawing Sheets

SOLITARY BEE EMERGENCE BOX

BACKGROUND OF THE INVENTION

1. Field of the Invention

The invention relates to improved field incubators for solitary-nesting pollinating bees and methods for rearing and managing such bees.

2. Description of the Prior Art

In the United States, honey bees have been typically looked upon as the only pollinator of our farm crops. Domestic hives of bees are rented and placed as needed to facilitate pollination. More than 2 million honey bee colonies are rented each year in the United States. Over $14 billion worth of crops nationwide rely upon pollination by insects, and of these, honey bees have carried the largest portion of the pollination work load. Most fresh fruit and vegetable, nut and seed crops rely upon insect pollination, including almonds, apples, blueberries, peaches, strawberries, cherries, melons, pears, plums, pumpkins and squash. Many seed crops also rely on insect pollination, including alfalfa, canola, sunflowers, carrots, and onions.

On most crops, honey bees can and do in fact provide an adequate job of pollinating. However, for some crops the honey bee provides only marginal pollination. This may be due to any of a variety of reasons including blooming patterns and blossom/flower anatomy. For instance, some crops bloom at lower temperatures and hence prior to the activity temperature of the honey bee. The blossoms and flowers of other plants may also have petal patterns which make it difficult for the honey bee to successfully pollinate that flower. In other situations, honey bees prefer to forage on other plants providing more abundant pollen or nectar than the target crop.

Of far greater concern however, has been the precipitous decline in the number of honey bees available for pollination. In the last 10 plus years, North American honey bees have come under unprecedented attack from 3 different sources. As a consequence, many beekeeping operations have been forced out of business, creating a critical shortage of honey bees for pollination in some areas. For example, in 1981 Pennsylvania had 85,000 commercial bee hives. By 1995, that number was reduced to 27,000 hives (Penn State Agriculture, Winter/Spring 1998). Other states have suffered similar losses, including Maine—80%, New Jersey—60%, New York—60-70%, Delaware—25-40%, Michigan—60%, and Wisconsin—67%. Wild honey bee populations have suffered as well. It has been estimated that the Northeast may have lost as many as 80% of its wild honey bees.

The causes for the bee colony losses have primarily been attributed to two parasites, tracheal mites and Varroa mites. Various treatments have been tried, and experiments with other methods and treatments are continuing in an effort to control these parasites. The results have been mixed and none are completely satisfactory. These parasites, compounded with poor weather and other mitigating factors, have left farmers and orchardists scrambling to find adequate pollinators for their crops.

To compound the problem with these mites, the Africanized honey bee (a cross between the European honey bee and African bees) has infiltrated Texas, New Mexico, Arizona, and California, and populations of these bees are steadily progressing Northward, bringing with them their hostile behavior and propensity for multiple stings. This has made it ever increasingly difficult to locate bee colonies for crop pollination in close proximity to populated areas.

Unfortunately, it has been the small to medium sized farm and farmers that have felt the pinch most severely. In this period of shortage, the suppliers of rented honey bee colonies have naturally catered to their larger accounts, and the smaller farms have been seriously in need of a pollinator for their crops. Moreover, it is often the small farmer who is found working the smaller pieces of ground located close to or amongst homes and commercial areas, where complaints from residents over permanent or rented honey bee colonies have prompted concerns and conflicts.

In view of these mounting problems, investigators and users have attempted to develop alternatives to the honey bee for pollinating crops. For instance, in recent years bumble bees have been increasingly used in the pollination of greenhouse tomatoes and other greenhouse crops. Solitary bees have also shown promise as alternative pollinators. One of these, the alfalfa leafcutting bee, *Megachile rotundata*, has been used for years in the production and growing of alfalfa seed. In 1990, 2.2 billion alfalfa leaf cutting bees, worth nearly $11 million, were used in the U.S. to pollinate alfalfa seed production acreage. In 1976, Phil Torchio at the USDA Agricultural Research Service, Bee Biology Systematics Laboratory in Logan, Utah, initiated investigations into the use of the blue orchard bee, *Osmia lignaria* Say (Hymenoptera: Megachilidae) (also known as the orchard mason bee). The use of these and other solitary bees as pollinators have been reviewed by Jesiolowski (1996, Organic Gardening, May/June, pp. 28-35) and Schuessler (1998, Frontier Magazine, September/October, pp. 20-23).

Solitary bees have demonstrated several highly desirable characteristics and advantages over honey bees which make them advantageous for use as pollinators on several crops. Most notably, the solitary bees are more efficient pollinators of many crops than honey bees, requiring far fewer bees to pollinate a field or orchard than honey bees. Moreover, some solitary bees are typically active in early spring, often before honey bees reach their optimum activity. For instance, the blue orchard bee will fly at temperatures about 5° C. lower than honey bees, and will fly more on overcast days and in higher humidity. As such, they are ideal for early spring crops and blossoms which need pollination during the typically poorer weather of this period. Other advantages of note include their gentle nature, and their insusceptibility to the parasites that have recently decimated honey bee populations. Moreover, solitary bees cannot hybridize with African or Africanized honey bees.

The blue orchard bee is a particularly efficient pollinator of orchard flowers. Orchard pollination proficiency is due to the bee's natural emergence in the spring, preference for the nectar and pollen of fruit tree flowers, and promiscuous foraging behavior (Torchio, 1976, J. Kansas Entomol. Soc. 49: 475-482; Torchio, 1985, J. Kansas Entomol. Soc. 58: 448-464; Torchio, 1987, Proc. Entomol. Soc. Ontario 118: 111-124; Bosch et al., 2006, J. Econ. Entomol. 99: 408-413; Bosch and Kemp, 2001, How to manage the blue orchard bee as an orchard pollinator. Sustainable Agricultural Network, Handbook No. 5, Beltsville, Md.; Bosch and Kemp, 2002, Bull. Entomol. Res. 92: 3-16, 2002). This univoltine species is a cavity-nesting bee that naturally occurs throughout most of the United States and into southern Canada (Rau, 1937, Ann. Entomol. Soc. Am. 30: 324-343; Mitchell, 1962, Bees of the eastern United States, Vol. II. Tech. Bull. No. 152, North Carolina Exp. Sta., 557 pp). The adult bees overwinter in their cocoons and in the spring readily will emerge within a few days when exposed to warm temperatures (Bosch and Kemp, 2001, ibid). Commercial management of blue orchard bees includes maintaining them in artificial nesting cavities and subjecting them to defined temperature regimes during winter and spring to facilitate emergence of adults in synchrony with orchard bloom. With care and proper management, a blue orchard bee population can be sustained and increased, thus allowing an orchardist to maintain a supply or surplus of pollinators (Torchio 1976, 1985, 1987; Bosch et al. 2006; Bosch and Kemp 2001, 2002, all ibid).

Blue orchard bees can be used alone, or in addition to honey bees, for fruit tree pollination. One problem that has hindered the use of any bees for pollinating almonds is that almond trees bloom early in the spring when temperatures can still be cool enough to inhibit bee emergence and foraging activity (Torchio, 1976, ibid). The blue orchard bees will fly under overcast skies and at lower temperatures (12° C.) than honey bees (Bosch and Kemp 2001, ibid), yet may be slow to emerge from their cocoons under field conditions. Especially for female bees, cool field temperatures can inhibit the bees' quick and synchronous emergence. A consequence of slow, asynchronous emergence is that many bees may still be in their cocoons when the earliest, most productive almond bloom occurs (Delaplane and Mayer, 2000, Crop pollination by bees. CABI, New York, USA, 344 pp.). Because the cross-pollination of nearly 100% of almond flowers is required for adequate crop production (Delaplane and Mayer, 2000, ibid), overall fruit yield may be suboptimal if some flowers demise before pollinator foraging ensues.

If the blue orchard bees are wintered for sufficiently long periods, and if the maximum daily temperatures are above 20° C., then incubating bees after their wintering period is not necessary. However, only sometimes will the unpredictable spring weather provide conditions that allow for synchronous emergence of bees and bloom. Sometimes conditions can be such that bee emergence is arrested while bloom continues to progress. For example, various cultivars of almonds will progress towards bloom by accumulating heat units at base temperatures ranging from 1.1-8.9° C. (DeGrande-Hoffman et al., 1996, J. Appl. Ecol. 33: 812-818), while blue orchard bees seem to progress towards emergence at temperatures above 5° C. (Bosch and Kemp, 2001, ibid). Considering various factors related to successful fruit set in almonds, the optimum temperatures influencing flight of pollinators, germination of pollen, pollen tube growth, and maintenance of ovule viability are considered to be 15-25° C., and temperatures outside of this range can be inhibiting [Kester and Gradziel, 1996, Almonds, in: Janick J., Moore J. N. (Eds.), Fruit Breeding, Vol. III. Nuts, John Wiley & Sins, Inc., New York, N.Y., pp. 1-97].

If the timing of fruit tree blossom is ahead of that of bee emergence, blue orchard bee nests containing wintered adults can be incubated under artificial conditions away from the orchard, and the adults can be collected in containers and released into the field (Torchio 1981, J. Kansas Entomol. Soc. 54: 824-836; Torchio, 1982, J. Kansas Entomol. Soc. 55: 759-778; Bosch and Kemp, 2001, ibid). However, females released as emerged adults express higher pre-nesting dispersal rates (Torchio, 1984, J. Kansas Entomol. Soc. 57: 517-521; Torchio, 1985, ibid), thus diminishing female establishment and reproduction in the orchard.

Efforts to introduce and rear these and other solitary bees in orchards and fields have typically involved the provision of nesting blocks in which the bees will nest and lay eggs. Most common nesting blocks are simply formed from blocks of wood into which small holes have been drilled into one face thereof, and into which paper straws may be optionally inserted. Alternatively, nesting blocks are formed from clusters of conventional drinking straws packed into a container with one end left exposed (see Jesiolowski, ibid). However, wooden nesting blocks tend to be difficult to disinfect and are heavy and difficult to drill and handle. If these blocks are not properly disinfected, any eggs laid therein will be susceptible to disease.

McCarthy (U.S. Pat. No. 4,765,007) has disclosed a nesting block for the alfalfa leaf cutter bee which is formed from a block of molded polystyrene having a plurality of holes extending therethrough. These holes are closed on one end by application of a backing sheet onto one face of the block. In all of these designs, a single adult female bee will form cells within the holes or straws, with each cell having a ball of pollen or nectar upon which a single egg is deposited. Adjacent cells within any one hole or straw are separated from one another by partitions formed from mud or plant parts which differ with each species of cavity nesting solitary bee. After nests have been laid and the adult bees have pollinated the area in the vicinity of the block, the blocks may be collected and stored for use in the next year. When placed in the field the following season, adult bees will emerge from the nests and repeat the cycle.

More recently, Kendell et al. developed an improved nesting block for the rearing and management of cavity nesting solitary bees used for pollinating crops. This nesting block included a chamber having at least one substantially flat face and a plurality of tubes which extended from the face into the chamber from the face. The chamber was formed from an organic polymeric material, a major portion of which was polycarbonate.

However, despite these advances, the need persists for improved material and techniques for rearing and managing solitary bees before they can be used on an increasing scale as crop pollinators.

SUMMARY OF THE INVENTION

We have now discovered an improved device and method for incubating nesting solitary pollinating bees and enhancing their emergence from their cocoons under field conditions. The device includes a first outer and second inner openable/closable hollow containers, wherein a nest containing the bees may be disposed within the inner container, and first and second communicating openings are provided on the lower surfaces of their respective containers to provide access to the environment from the nest in the inner container. To allow egress of bees from the nests to the environment while inhibiting or preventing their return, a one-way exit is provided in communication with the second opening, which is also attached to or extending through the first opening. Controlled heating of the nest is effected by disposing a heating element within the first, outer container and external of the second, inner container. A temperature controller in communication with the heating element for controlling the same, as well as an electrical power source operably connected to the heating element for providing power thereto are provided.

In use, a nest or cocoons of viable solitary pollinating bees are provided within the second, inner container, and the device is placed in the locus or vicinity of an orchard or a field of an agronomically important crop or horticultural plant wherein the conduit and one-way exit are out of contact with the ground. The bees in nests or cocoons are retained in this device while maintaining the bees at a temperature conducive to the growth and emergence of bees at least during a portion of the day or night until the bees have emerged from their cocoons and exited the nest and the containers.

The device provides controlled heat application to the bees in their cocoons in an even distribution throughout the interior chamber holding the nesting bees, decreasing the time for emergence and promoting a more synchronous timing of the emergence of the population of the bees. The device also prevents water from entering and wetting the bees, thereby reducing susceptibility to disease, and prevents the bees from re-entering once they have exited the device, enhancing the dispersal of the bees and increasing the development of new nests away from the old nests within from device, and decreasing their exposure to microbial pathogens in the old nests.

In accordance with this discovery, it is an object of this invention to provide an improved apparatus and method for incubating nesting solitary pollinating bees and enhancing their emergence from their cocoons under field conditions.

Another object of this invention is to provide an apparatus and method decreasing the time for emergence of nesting solitary pollinating bees and promoting a more synchronous timing of emergence of the population as a whole.

A further object of this invention to provide an improved apparatus and method for incubating nesting solitary pollinating bees and enhancing their emergence from their cocoons which prevents the bees from re-entering the old hives once they have exited the device.

Other objects and advantages of the invention will become readily apparent from the ensuing description.

DETAILED DESCRIPTION OF THE INVENTION

The incubation and emergence apparatus and method of the invention may be used for incubating and enhancing the emergence of a variety of cavity nesting solitary bees effective for pollinating crops. Without being limited thereto, the device is especially suited to use with cavity nesting solitary bees of the genera *Osmia*, *Megachile*, and *Xylocopa*, generally referred to as mason bees, leafcutting bees, and carpenter bees, respectively. Representative examples of species which are preferred for use herein include the blue orchard bee (*O. lignaria*), and the alfalfa leafcutting bee (*M. rotundata*), as well as the horn faced bee (*O. cornifrons*), the sunflower leafcutting bee (*Megachile pugnata*), and the blueberry bees (*O. attriventris* and *O. ribifloris*). As described in greater detail hereinbelow, use with the blue orchard bee is particularly preferred. The blue orchard bee is a common native bee of North America, living and foraging in most of the continental U.S., and is a highly efficient pollinator of many fruit crops, most notably almonds, apples, cherries, pears, and plums.

Figure 1:
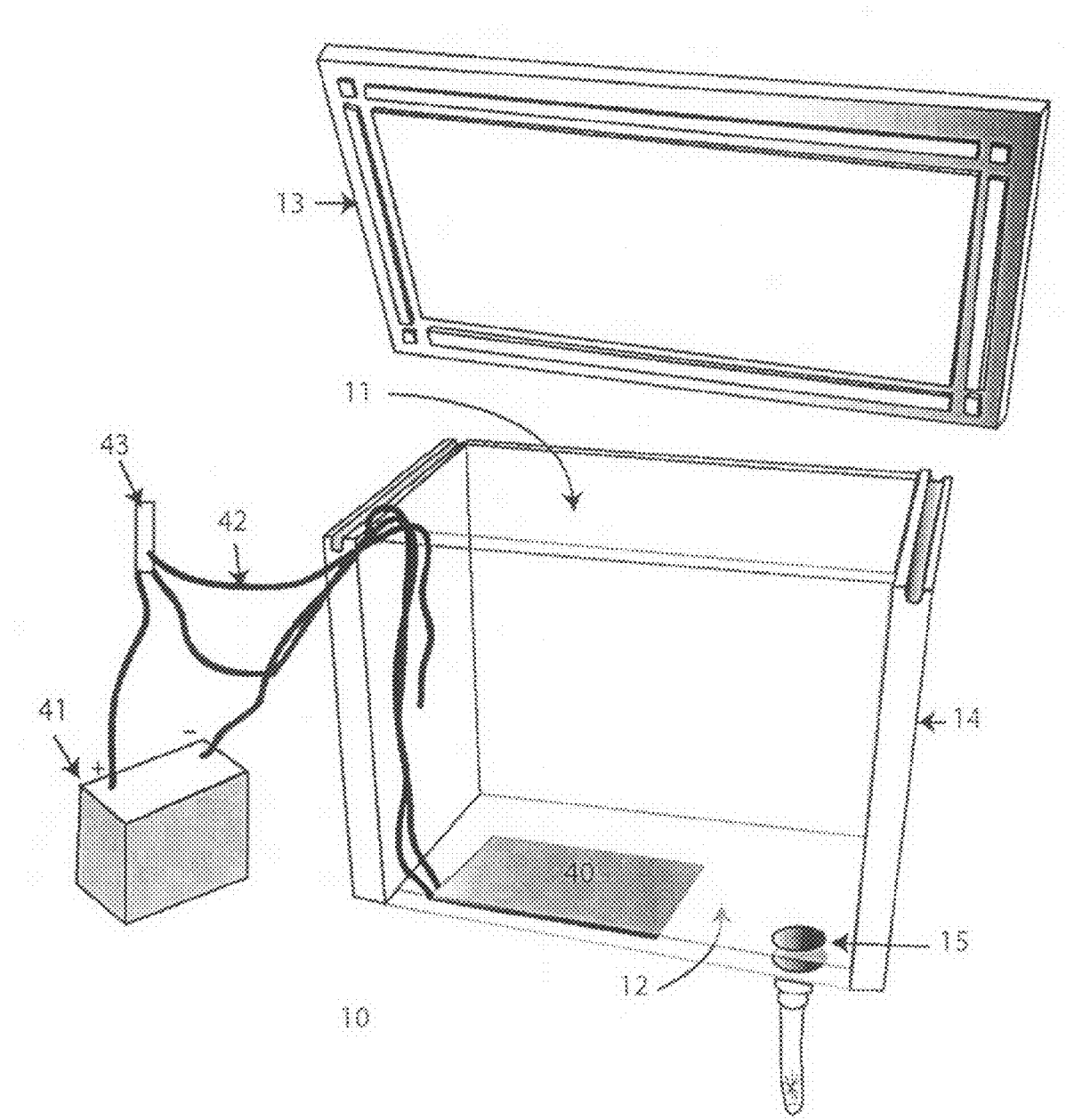
FIG. 1 shows the first, outer container of the emergence box of the invention with accompanying heating element, thermostatic temperature controller, and power source, as described in Example 1.
Figure 2:
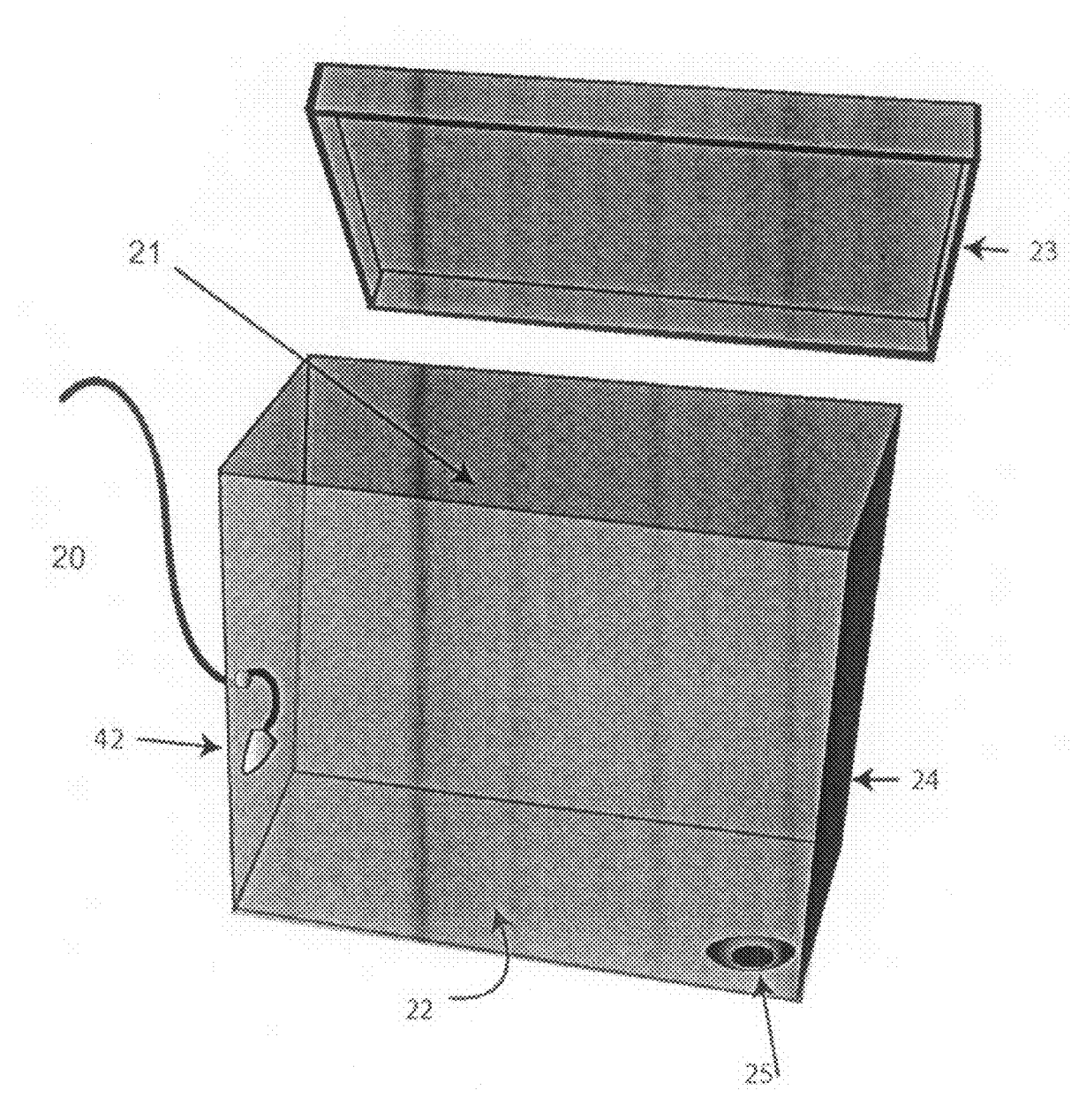
FIG. 2 shows the second, inner container of the emergence box of the invention adapted to receive one or more nests or cocoons, as described in Example 1.
Figure 3:
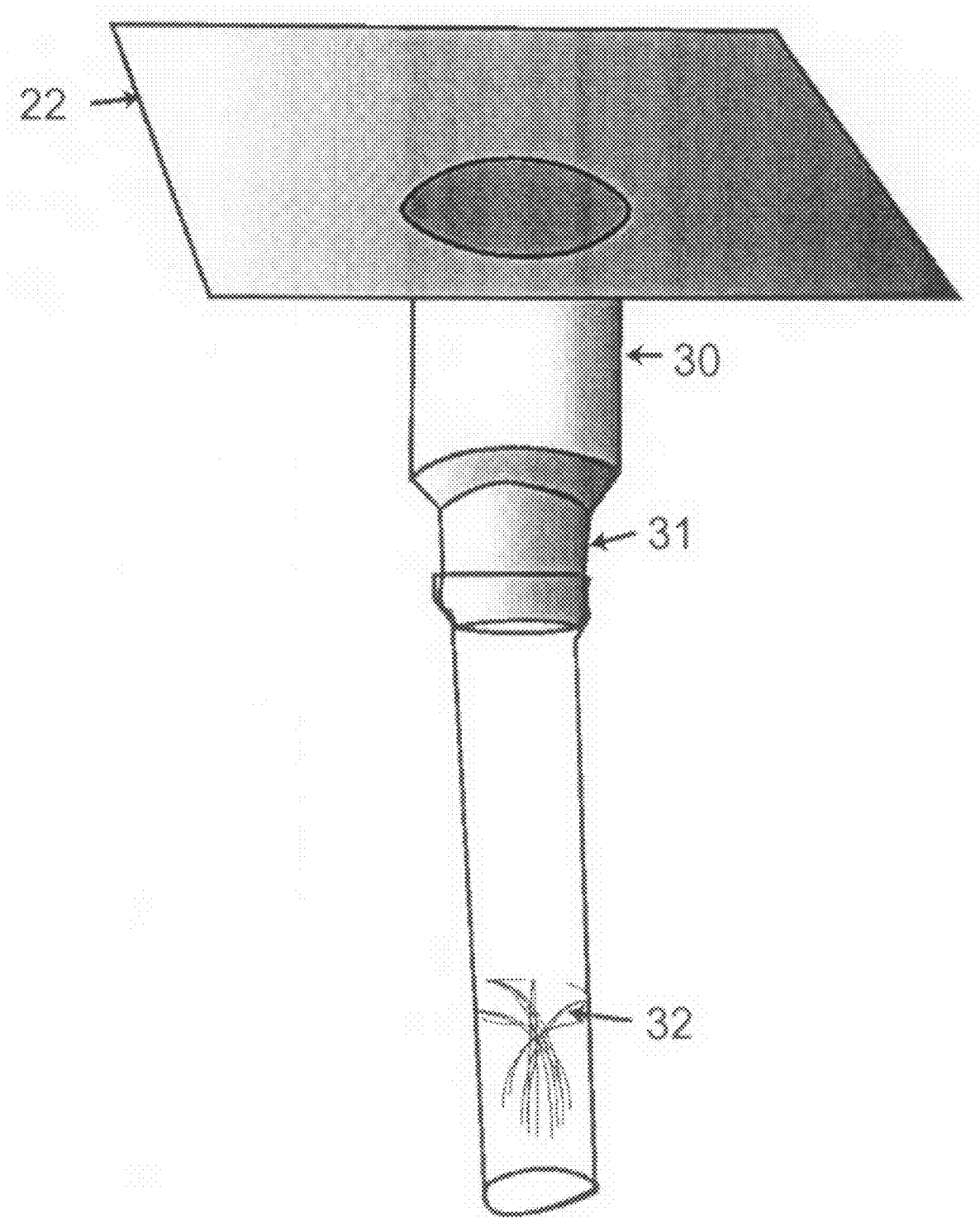
FIG. 3 shows the one-way exit attached to the bottom opening of the second, inner container of the emergence box of the invention, which will extend through the opening of the first, outer box, as described in Example 1.

Referring to FIGS. 1-3, the apparatus of the invention includes a first openable/closable outer container or housing 10 comprising a hollow interior chamber 11, an approximately horizontal first bottom surface 12, a first opposed upper surface 13, and a first closed side wall 14 extending between the bottom and upper surfaces and enclosing or encircling the interior chamber. To allow egress of the bees from their cocoons or nests placed in the inner housing 20, the first bottom surface 12 includes a first opening or outlet port 15 therethrough. At least one of the bottom surface 12, upper surface 13 or side wall 14, but typically the upper surface, should be openable and closable, preferably forming a substantially water tight seal to prevent rain from entering the device. The material of construction of the first container is not critical, provided that it provides relatively good thermal insulation of the contents therein. A variety of thermal insulating (non-thermally conductive) materials are suitable for use herein, although Styrofoam or other rigid, open or closed cell polymeric foams are preferred for their relatively low cost.

The nests or cocoons containing the bees to be eventually released into the fields or orchards are placed in a second openable/closable inner incubation container 20 which is adapted to fit within the hollow interior chamber 11 of the first container 10. This second container 20 includes a hollow interior chamber 21 of sufficient size for holding multiple nests or cocoons of the solitary pollinating bees therein, an approximately horizontal second bottom surface 22, a second opposed upper surface 23, and a second closed side wall 24 extending between the bottom and upper surfaces and enclosing or encircling the interior chamber 21. As in the first container, the second bottom surface 22 also includes a second opening or outlet port 25 therethrough to allow the emerged bees to exit the apparatus. This second opening 25 is in communication with the first opening 15, although their relative positions are variable. Thus the first and second openings may be substantially opposed and contiguous, or they may be vertically spaced apart in which case they may be horizontally displaced or opposed and connected by a conduit. Both the first and second openings 15 and 25, respectively, should be of sufficient size to allow the passage of an adult solitary pollinating bee therethrough. At least one of the bottom surface 22, upper surface 23 or side wall 24, but typically the upper surface, should be openable and closable, preferably forming a substantially water tight seal. The material of construction of the second container also is not critical, but in contrast to the first container 10, at least a portion of the second container 20 which is adjacent to the heating element (described in greater detail hereinbelow), and preferably the entire container 20, is constructed of a thermally conductive material. A variety of thermally conductive materials are suitable for use herein, although organic polymers, and particularly polycarbonate, are preferred.

To allow the emerged bees to exit from the hollow interior chamber 21 to the environment, a one-way exit 30 extends through the first opening 15 in communication with the second opening 25. The inclusion of this one-way exit 30 is critical to inhibit and preferably prevent the bees from re-entering the nest once they have emerged from the containers. In a preferred embodiment, the one-way exit 30 comprises a substantially cylindrical conduit, passageway or tube 31 having a plurality of inwardly projecting flexible bristles 32 positioned therein (i.e., lining the interior wall of the conduit), and which are angled downwardly in a direction away from the second opening 25. The bristles should be of sufficient length and be of sufficient resilience to allow the passage of the crawling adult bees in the same downward direction, while preventing the adult bees from prying the bristles apart for moving in the opposite direction, up the conduit 31 toward the nest in the first container. The precise length and number of the bristles may be determined by routine experimentation. However, by way of example and without being limited thereto, the bristles are preferably of sufficient length such that the proximate ends thereof facing the interior of the conduit are approximately adjacent to one another, and preferably even slightly overlapping (i.e. the bristles overlap distally). A sufficient number of bristles should be provided that there are no holes or gaps in the coverage of the interior wall of the conduit through which an adult bee could pass. A variety of bristles are suitable for use herein, and include but are not limited to hogs hair and flexible polymer filaments such as used in the bristles of tooth brushes. The conduit 31 should fit tightly in the opening 25 of the second bottom surface 22 or be otherwise affixed and sealed thereto to prevent the emerged bees from moving between the containers. The upper edge of the conduit is preferably flush with the inner surface of the bottom surface 25 (i.e., no ridge) to avoid the presence of any obstacle which might impede the bees entrance into the conduit. The material of construction and size of the conduit 31 in which the bristles are disposed is not critical. The conduit may also be constructed from a variety of materials, but is preferably approximately transparent, thereby facilitating the natural tendency of the bees to move from the dark to the light and hence stimulate their exit from the nests and containers. The conduit 31 should have a sufficiently large internal cross section to allow the passage of the adult bees therethrough, yet not so large that large insects or other predators may pass into the containers to the nests.

It is envisioned that alternative, albeit less preferred, one-way exits may also be employed. For example, in one alternative embodiment, the one-way exit may comprise an approximately truncated cone-shaped member (i.e., frusto-conical) tapering away from said second opening and having an aperture at the apex thereof of a size effective to allow egress of the bees while inhibiting their entrance therein, even if their wings are extended. Another alternative one-way exit comprises a closure or flap extending over the lower open end of the conduit which can only be opened or swung outwardly, away from the containers. Prevention of the closure from swinging inwardly may be effected, for example, by use of one-way hinges, or providing the member with an overlapping portion or an attached flange which extends beyond the edge of the opening, thereby preventing the member from being pushed inwardly. Yet another alternative one-way opening comprises a flexible member configured as an outward protrusion such as a convex bubble, pyramid or cone, which includes one or more slits through the apex thereof which will allow the bee to push through the slit(s) and exit the device to the environment, and which will return to its normal closed position after the bee has passed, and which could not be pried apart by the bees for re-entry. Due to the outward protrusion of the member, the bees should be unable to pass through the opening in the opposite direction. In this embodiment, the flexible member should be sufficiently flexible as to allow the bee to push through the slit(s), but should have sufficient resiliency and tensile strength to prevent the bees from passing in the opposite direction. However, each of these alternative one-way exits may be somewhat prone to either easier, undesired ingress of the bees, or to bees becoming caught thereon and blocking the exit entirely.

At least one of the first container 10 and second container 20 are constructed from a substantially opaque material effective to substantially prevent light from the environment to reach the nests in the second hollow interior chamber 21 except through the first opening 15, second opening 25, and the one-way exit 30. The shape of the apparatus, and specifically the first and second containers, is not critical. By way of example and without being limited thereto, the first and second side walls 14 and 24, respectively, may have a regular or irregular horizontal cross-sections, including those independently selected from closed curves, polygons, quadrilaterals, circles, ovoids, and ellipses.

To heat the hollow interior chamber 21, a heating element 40 is disposed within the hollow interior chamber 11 of the first container 10, external of the second container 20, or the heating element is arranged inside the second container 20 if care is taken to prevent direct exposure of the bees to the heating element 40, so that the bees do not overheat before emerging, and also ensuring that the heat is evenly distributed throughout the second container 20, possibly by providing a porous false bottom for the second container 20. An insulating material such as mica or rubber may be provided to electrically isolate the heating element from the containers. The particular heating element used is not critical, and a variety of conventional heating elements are suitable for use herein, provided that the heating element is of a size and electrical resistance effective for warming a nest disposed within the apparatus. The heating element is operably connected (wired) to a power source 41, which is preferably portable for providing power thereto, and a temperature controller 42 such as a thermostatic control element, effective for adjustably controlling the heat generated by the heating element. A variety of power sources are suitable for use herein, although typically, power will be supplied using batteries or capacitors. In one preferred embodiment, the power supply will include a solar panel or wind powered generator 43 to trickle charge the batteries. In another preferred embodiment, the heating element, power source, and temperature controller should be effective for warming the hollow interior chamber 21 to a temperature appropriate for the incubated bees (e.g., between about 20° C. to about 30° C., and for blue orchard bees between about 20° C. to about 25° C., most preferably between about 21° C. to about 22° C.).

In use, one or more nests (artificial or natural) or cocoons of the selected solitary pollinating bees are provided within the second inner container 20, and the device is placed in the locus or vicinity of an orchard or a field of an agronomically important crop or horticultural plant wherein the conduit and one-way exit are out of contact with the ground. The device is particularly suited for use with the nesting block developed by Kendell et al. (U.S. Pat. No. 6,364,738). The bees are retained in this device while maintaining the nests at a temperature conducive to the growth and emergence of bees within the nests at least during a portion of the day or night, until the bees have emerged from their cocoons and exited the nests in the containers. It is also envisioned that the heating period may be extended to provide heating throughout the day and optionally the night.

The following example is intended only to further illustrate the invention and is not intended to limit the scope of the invention which is defined by the claims.

EXAMPLE 1

The heated emergence box of this invention was evaluated for bee emergence in the field to demonstrate that heating the boxes early in the day would allow females to gain more heat units than females left at ambient temperatures and consequently emerge sooner and faster (i.e., over a few days).

Materials and Methods

Bee Populations:

Study populations were the progeny of northern Utah bees flown in almond and apple orchards in California and Utah, respectively. These bees nested in wood blocks with paper drinking straw inserts (15 cm long and 8 mm in diameter). Nests obtained from the California orchard were pulled from the wood blocks, brought to the ARS Bee Biology & Systematics Laboratory in Logan, Utah, and placed in cold storage (4-5° C.). This population remained as mature adults under wintering conditions for 201 days. The nests from the Utah orchard were pulled from the wood blocks and placed in cold storage in the laboratory, and remained there for 205 days. During the winter period, X-radiography was used to assess the number and sex of live adults while still inside the straw nests so that experimental treatments could be allotted similar numbers of female bees. As mentioned, females take longer to emerge than males, and thus we only monitored female emergence. Once almond bloom was imminent in California, the bees were placed into portable coolers and driven to an almond orchard in Modesto, Calif. for release. Likewise, upon the onset of apple bloom in North Logan, Utah, bees were driven a short distance to an apple orchard for release.

Shelters and Nesting Materials:

In both the California and Utah orchards, bees were released from five wooden shelters, to which different emergence treatments were applied (see below). In California, the shelters were constructed of a vertical sheet of plywood (122 cm×122 cm) with two horizontal shelves (situated approx. 0.8 m and 1 m from the ground), with other plywood panels forming two sides and a roof. The shelter was attached to fence posts, elevated approximately 1 m off the ground, with the open face pointing in a southeastern direction. Orientation to the southeast facilitates the gathering of early morning sunlight and its warmth (Bosch and Kemp 2001, ibid). Box-shaped shelters (61×61×61 cm) were used in Utah. They were elevated approximately 1.5 m off of the ground using fence posts so that the open side faced a southeast direction. Both shelter types were designed to protect nest blocks from wind and rain, yet allow for ventilation. In California, the shelters were situated in a 15 acre almond orchard in a row of almond trees with a interspacing of 100 m. In Utah, the shelters were placed in a 3 acre apple orchard, set evenly across several rows of apple trees with an interspacing of approximately 30 m. A field incubation box (described below) and a drilled wood block were placed in each of the five shelters as structures for the release of emerging adult bees. The wood blocks (15×15 cm) had 49 holes (15 cm long and 8 mm in diameter) drilled into one face which served as nest cavities into which straws containing nests could be inserted (Torchio 1982, ibid).

Field Incubation Box:

The unique field incubation box of the invention was designed having an inner compartment for holding whole nests in paper straws or individual cocoons. The inner compartment was constructed of black, high-density polycarbonate (Laird Plastics, Salt Lake City, Utah) (0.4 cm thickness, 24 cm length, 18.5 cm width, 25.5 cm height) (FIG. 2). The outer insulating layer was a Styrofoam box (2.3 cm thickness, 40 cm length, 24.5 cm width, and 29.0 cm height) (FIG. 1). A 35 watt, silicone rubber, electric heat blanket (Gordo Sales, Inc., Layton, Utah) (0.5 mm thickness, 30.5 cm length, 15.2 width) was placed on the bottom of the Styrofoam box and was in contact with the outside bottom of the black box when it was inserted. The heat blanket was powered by a 12-volt battery, and temperature inside the box was controlled with a custom-made thermostat set to turn off at 21-22° C.; no low temperature threshold was set. As needed, batteries were recharged during the night with a battery charger, or with a solar panel during the day (FIG. 1). Preliminary tests showed that the arrangement of equipment in the incubation box allowed for even heating throughout the inner compartment of the box. As bees emerged from the nests in the emergence box, they could leave the box via a clear, vinyl tube (~8 cm long, 1.9 cm in outer diameter and 1.6 cm in inner diameter) that extended to the outdoors from one end of the bottom of the box (FIG. 3). The upper edge of the tube was flush with the inner surface of the bottom of the inner box to prevent the formation of any obstacle to the bees entering the tube. Because $O.$ $lignaria$ females tend to return to old nests for re-nesting, boar bristles (~2 cm length) were inserted at the distal end of the exit tube facing outwards, which inhibited bees from reentering the incubation box once they had left.

Treatments:

Two incubation treatments were devised, and each treatment was replicated in the field in the five shelters. The treatments were: nests in wood blocks, and nests in incubation boxes. Additionally, loose cocoons (placed individually in glass vials) were included in the incubation boxes.

Nests in blocks: Nests (in paper straws) containing a total of about 30 females were inserted into the holes of a wood block (described above). The paper straws housing the nests were slit longitudinally so that each straw could be opened and each cell examined for emergence.

Nests in incubation boxes: Nests (in paper straws) containing a total of about 30 females were adhered to a sticky board and then placed inside the incubation box. The paper straws were slit longitudinally as described above for monitoring. Additionally, thirty female cocoons were excised from their straw nests and individually stored inside glass vials (20 ml). The vials were affixed to a sticky board, and the board placed into the box. The heaters in the incubation boxes were turned on each morning (0630-0900) and turned off each evening (1700-1800).

Data Collection:

Once orchard bloom started, bees were placed into the incubation boxes and blocks. Once in the morning and once in the early evening, all bees were checked for emergence from 1) the cocoon and 2) from the nest. It was also noted if any bee had died. Examining the bees twice per day gave a more detailed portrayal of emergence, with some bees present in the morning but having flown away by the afternoon. In the California orchard, emergence was monitored from 17 to 27 February. This limited time frame was inadequate for recording the emergence of all the bees in the study. In Utah, emergence was monitored from 11 April to 6 May, a time frame which allowed for the fate of all bees to be determined.

HOBO dataloggers (Onset Computer Corp., Bourne, Mass.) were used to record temperature continuously in the incubation boxes, in the wood blocks (using a probe placed inside a cavity to one half of the length), and inside the shelter (not in direct sunlight) where the box and block resided. In California, due to failure of HOBOs to function properly temperature data were recorded for only the last days of the study, from 23 to 27 February. For the Utah study, temperatures were recorded throughout the emergence period, and thus degree-day accumulation could be calculated from the daily temperatures.

Statistical Analysis:

Data from the Utah and California studies were analyzed separately. A Chi-square test of independence using a 2×2 contingency table was used to compare the frequency of emerged and dead bees in nests in boxes and in blocks.

Paired T-tests were used to compare mean emergence time (from the cocoon and from out of the nest) between box and block treatments, and between emergence from cocoon (in nest or loose cocoons in vials) and from nests within box and block treatments. T-tests also were used to compare the number of days from emergence from cocoons in the nest until leaving the nest according to treatment. For this analysis, the number of days included 0.5 day increments. For example, if a bee was present on the first evening, but gone by the next morning, then time for emergence from cocoon to emergence from nest was counted as 0.5 day.

Results

Mortality:

Most bees placed out into the Utah and California orchards survived, regardless of treatment. In California, a few bees had not emerged from the cocoons before the end of the study period. Therefore, we report survival data only for those bees whose fates were known. A significant difference among treatments in average percent survival was found only in the Utah orchard, with higher survival of bees in the nests in blocks than in the nests in boxes ($\chi^2=8.45$, d.f.=1; p<0.005). This result was most probably caused by one replicate of nests in a box in which nine bees were dead, likely as a result of temperatures in that incubation box exceeding 41° C. on three days. Bees incubated as loose cocoons in this same box also expressed high mortality (7 dead bees).

Figure 4:
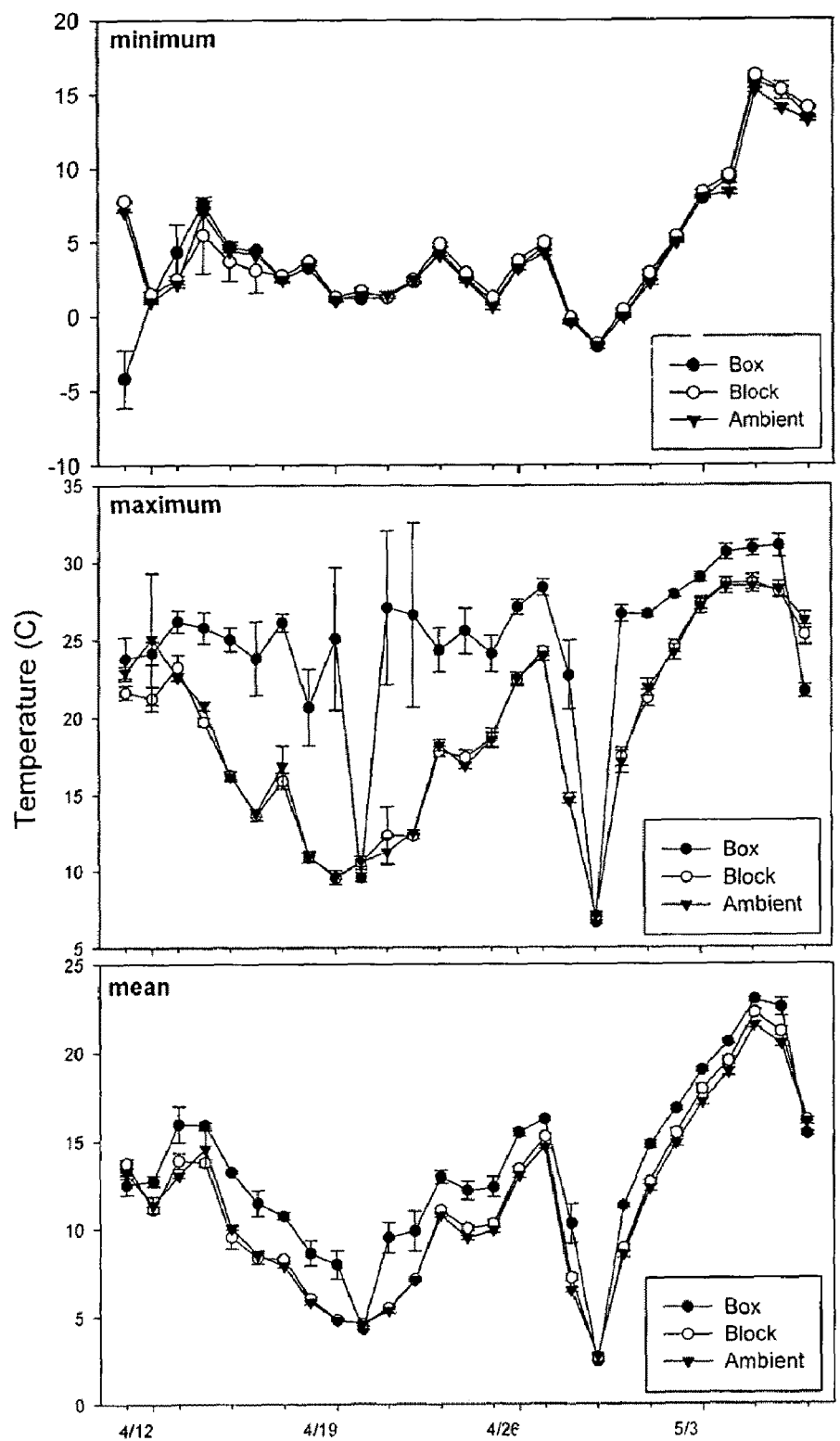
FIG. 4 shows the daily minimum, maximum and mean temperatures within nesting shelters (ambient), inside wood blocks, and inside incubation boxes in a Utah apple orchard. Values are means±SE of five replicates.

Emergence Time, Utah:

Average daily shelter (ambient) temperatures and temperatures inside the boxes and blocks during the emergence period are shown in FIG. 4. The minimum temperatures were very similar in the boxes, blocks and inside the shelters (ambient). However, maximum and mean temperatures were higher in the boxes than in the blocks or within the shelters. Maximum temperatures inside the boxes exceeded the set temperature of 22° C. It is not clear if the excessive temperatures represent inaccuracy of the thermostats or the combined effects of solar heating plus insulation of the boxes.

Figure 5:
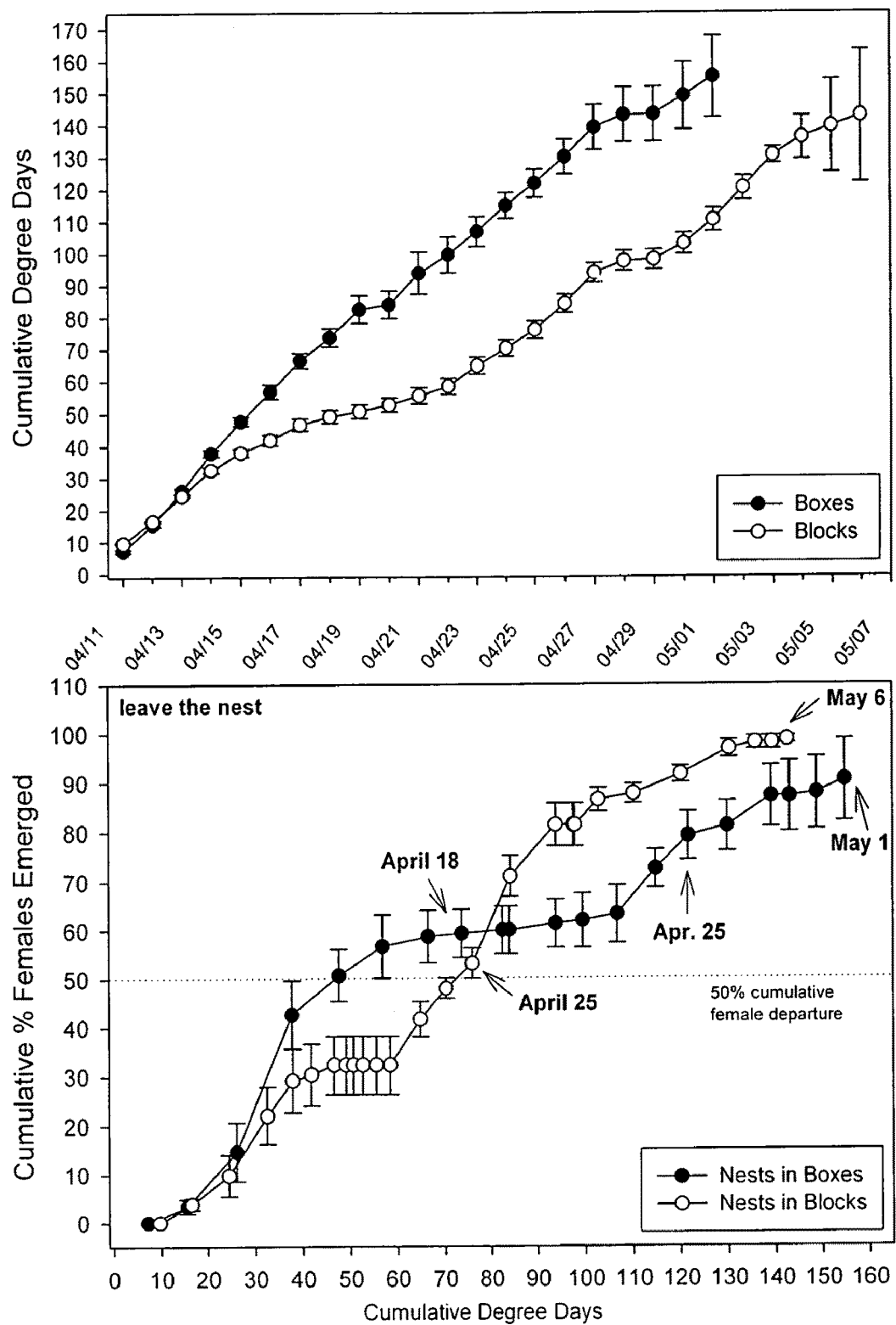
FIG. 5 shows the cumulative degree-days (base 5° C.) by date, and percent cumulative *Osmia lignaria* female departure by degree-day from nests in wood blocks and from nests in incubation boxes in a Utah apple orchard. Values are means±SE of five replicates.
Figure 6:
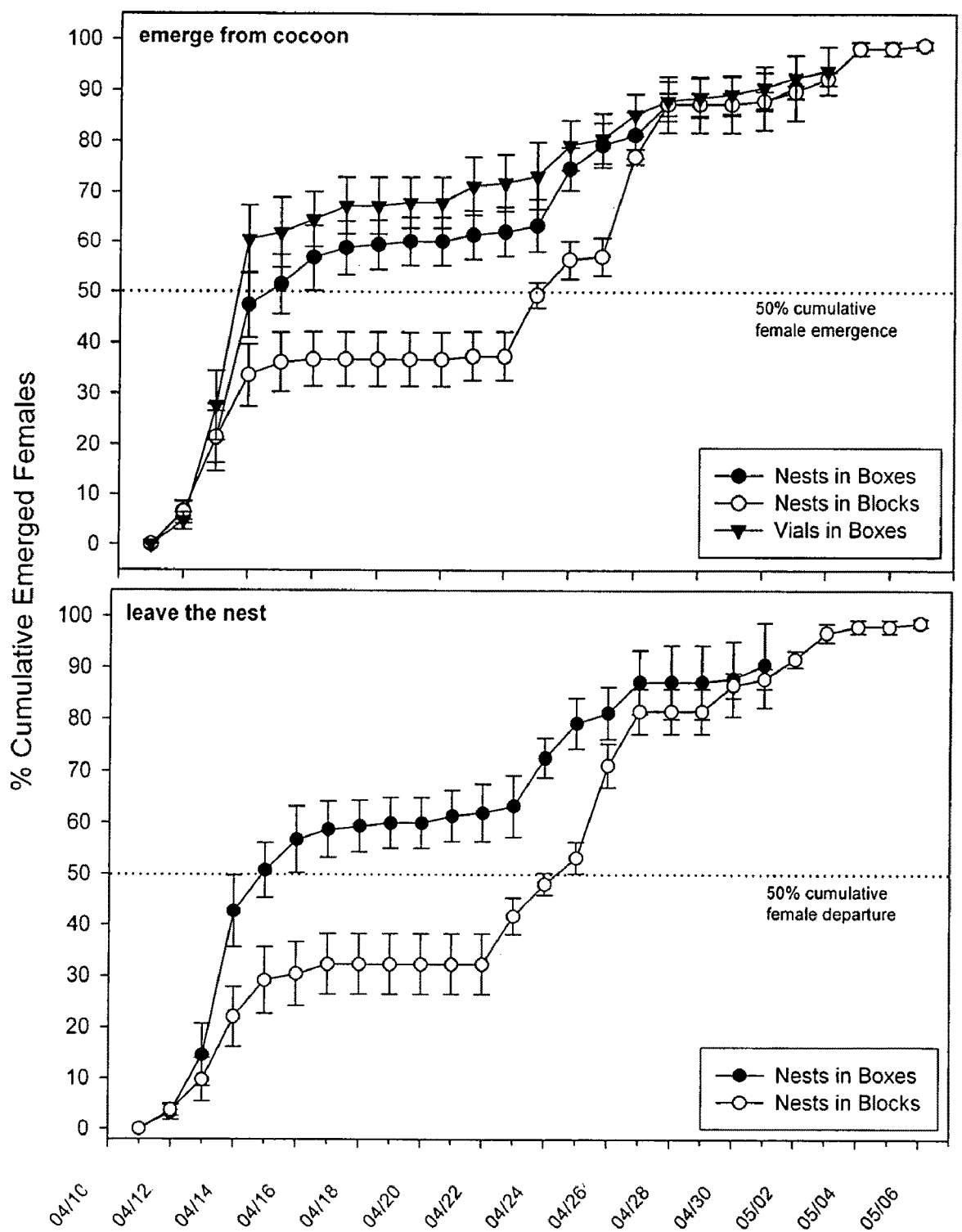
FIG. 6 shows the cumulative *Osmia lignaria* female emergence from cocoons in nests in wood blocks, and from cocoons in nests and loose cocoons in incubation boxes in a Utah apple orchard. Also, departure of females from nests in wood blocks and from nests in incubation boxes. Values are means±SE of five replicates.

In the incubation boxes, degree-days were accumulated at a faster rate than in the blocks (FIG. 5). In the boxes, an average 51% female cumulative emergence from the cocoons in nests occurred at accumulation of 48 degree-days on day 4 (FIGS. 5 & 6). In the blocks, 53% female cumulative emergence from cocoons occurred at 76 degree-days on day 12 (FIG. 5). The amount of time needed for leaving the nests from blocks was five days longer and at a slower pace than from boxes (FIGS. 5 & 6).

The mean number of days until emergence from cocoons was significantly lower in nests in boxes than in nests in blocks (T=-3.12, d.f.=4, p=0.04) (FIG. 6). Similarly, bees in nests in boxes took less time to leave the nest than bees in nests in blocks (T=-3.89, d.f.=4, p=0.018) (FIG. 6). The mean difference in time between emergence from cocoon and leaving the nest was significantly less in nests in boxes than in nests in blocks (T=-4.84, d.f.=4, p=0.008). Within the box treatment, there was no significant difference in time to emerge from the cocoon in the nest and time to leave the nest (T=2.1, d.f.=4, p=0.10). However, within the block treatment, there was a significant difference in time to emerge from the cocoon and time to leave the nest (T=6.84, d.f.=4, p=0.002).

For bees in the incubation boxes only, the mean number of days until emergence from cocoons in nests and from loose cocoons in vials was not significantly different (T=0.56, d.f.=4, p=0.60) (FIG. 6). There was also no significant difference in the mean number of days for emergence from loose cocoons and leaving the nests (T=1.29, d.f.=4, p=0.27).

Figure 7:
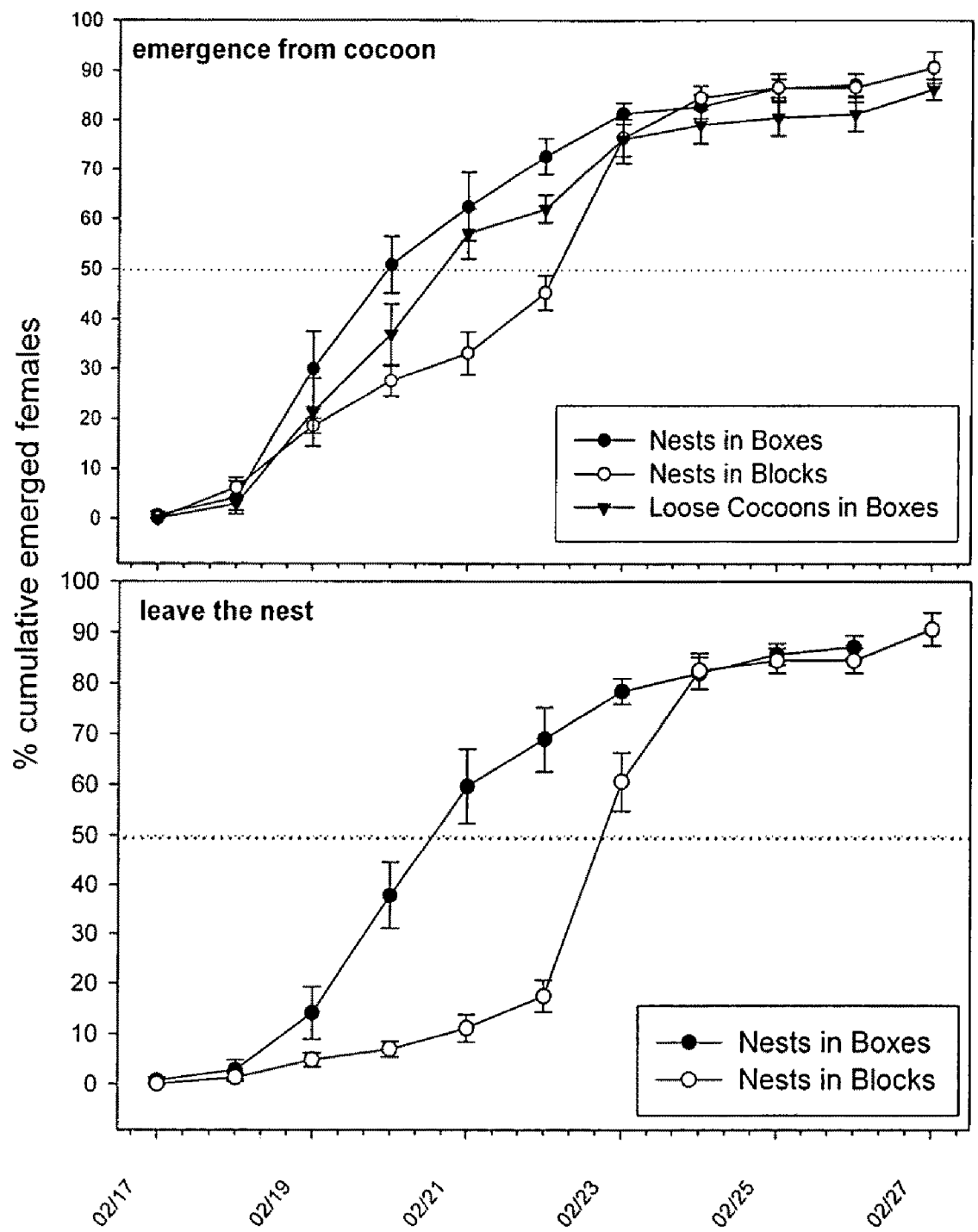
FIG. 7 shows the cumulative emergence from the cocoon and out of the nest throughout the emergence period in *Osmia lignaria* females from nests in wood blocks, nests in incubation boxes, and loose cocoons in incubation boxes in a California almond orchard. Values are means±SE of five replicates.

Emergence Time, California:

In the California orchard, no accumulation of degree-days during the emergence period was calculated due to temperature logger failure. More than fifty percent cumulative emergence from the cocoon occurred by day 4 in nests in boxes and by day 6 in nests in blocks (FIG. 7). Similar differences were obtained when these two treatments were compared for bee departure from the nest (FIG. 7).

The average number of days for emergence from the cocoons was longer for bees in nests in blocks than in nests in boxes, but this difference just failed significance (T=-2.66, d.f.=4, p=0.057) (FIG. 7). Time to leave the nests was significantly lower for females in nests in boxes than in nests in blocks (T=-5.50, d.f.=4; p=0.005) (FIG. 7). The mean number of days between emergence from cocoons and leaving the nests was significantly different for females in nests in boxes than in nests in the blocks (T=-5.20, d.f.=4, p=0.007). Within the box treatment, there was no significant difference in time to emerge from the cocoon in the nest and time to leave the nest (T=0.74, d.f.=4, p=0.50). However, within the block treatment, there was a significant difference in time to emerge from the cocoon and time to leave the nest (T=8.41, d.f.=4, p=0.001).

For the bees in the incubation boxes only, the mean number of days until emergence from cocoons in the nests and loose cocoons were not significantly different (T=-0.74, d.f.=4, p=0.50) (FIG. 7). There was also no significant difference in the mean number of days for emergence from loose cocoons and leaving the nests (T=-0.33, d.f.=4, p=0.76).

Discussion

The blooming period of fruit trees is brief and dependent on cultivar and weather. For example, blooming in various cultivars of apples lasts from 7-20 days, and in almonds from 10-15 days (Nyéki and Soltësz, 1996, Floral biology of temperate zone fruit trees and small fruits, Akadëmiai Kaidö, Budapest). When using *O. lignaria*, speed and synchrony of emergence are important factors for obtaining the most efficient pollination of fruit tree flowers and bee progeny production. Our incubation boxes enhanced emergence of *O. lignaria* females in the field. Average emergence time from the nest in incubation boxes in Utah took about eight days, compared to 13 days in the blocks. Female emergence from the nest in the incubation boxes in California took about five days, compared to seven days in the blocks.

The design of the incubation box had two purposes. First, compared to ambient conditions, the incubation boxes warmed the bees earlier in the day and for a longer period of the day. We did not intend to exceed the maximum daily temperature or to provide extra nocturnal warmth. Except in one overheated box, the high survival of the female bees in all treatments in both orchards verifies that the use and design of the box did not harm the bees. Previous studies have found increased mortality in populations incubated at 30° C. constant (Bosch and Kemp, 2001, ibid), and therefore efforts must be made to include a safeguard against the overheating of incubation boxes in the field. Second, the emergence tube of the incubation box kept bees from re-entering and re-nesting in their old nests (Bosch and Kemp, 2001, ibid). Keeping the bees out of the incubation box forced them to use new nesting materials supplied rather than establishing nests in old cavities. Female blue orchard bees prefer used nesting material to new material (Torchio, 1984, ibid), but the use of new nest material would help to decrease the incidence of exposure to bee microbial pathogens and parasites remaining in old nests. An understanding of what chemicals from old nests serve as nesting cues and that might be added to artificial materials would help in maintaining healthy, sustainable populations of *O. lignaria* for orchard pollination.

From the study in the Utah orchard, we verified that the accumulation of degree-days happened more quickly in the heated boxes than in the blocks under ambient conditions. It is clear that accumulation of degree-days is important in predicting female emergence from nests. However, other cues may be involved in stimulating bees to leave the nest, such as duration of exposure to some threshold temperature and the presence and intensity of ambient light. Our study provides no evidence that other stimuli were factors in encouraging bees to leave the nests in blocks more quickly than from boxes, for which ambient light would be less effective. Monitoring bee emergence from loose cocoons (Bosch and Kemp, 2000, Environ. Entomol. 29:8-13; Bosch et al., 2000, Environ. Entomol. 29:874-883) provides a good estimate of emergence time from the cocoons within nests. However, it takes females some extra time to leave the nests. Although not significant, this extra time is longer in nests in blocks (~1 day), than in nests in boxes (~0.5 day).

Using controlled temperatures, we know that after about 200 days of overwintering at 4° C., females take an average of four days to emerge from cocoons when incubated at constant 20 or 22° C. in the laboratory (Bosch and Kemp, 2000 and 2003, ibid). Use of the incubation box in the field resulted in a slower bee emergence compared to laboratory incubation, but had quicker emergence compared to ambient incubation. The incubation box is an effective tool for improving the management of a solitary bee as a pollinator, especially where climate is variable and unpredictable.

It is understood that the foregoing detailed description is given merely by way of illustration and that modifications and variations may be made therein without departing from the spirit and scope of the invention.

We claim:

1. An apparatus for the field incubation and emergence of nesting solitary pollinating bees which comprises:
   a) a first openable/closable outer container comprising a hollow interior chamber and a bottom surface, said first bottom surface comprising a first opening therethrough, wherein said outer first container is constructed from a thermal insulating material;
   b) a second openable/closable inner container disposed within said hollow interior chamber of said first container, said second container comprising a hollow interior chamber and a second bottom surface, wherein said hollow interior chamber of said second container is effective for holding solitary-nesting pollinating bees therein, and said second bottom surface comprises a second opening therethrough in communication with said first opening, which said second opening and said first opening are of sufficient size to allow the passage of a solitary pollinating bee therethrough;
   c) a one-way exit attached to or extending through said first opening and in communication with said second opening to allow the egress of said bee from said hollow interior chamber of said second container to the environment while inhibiting the entrance of said bee into said hollow interior chamber of said second container from the environment;
   d) a heating element disposed within said hollow interior chamber of said first container and external of said second container effective for warming a nest disposed within said hollow interior chamber of said second container;
   e) a temperature controller in communication with said heating element effective for controlling said heating element; and
   f) an electrical power source operably connected to said heating element effective for providing power thereto.

2. The apparatus of claim 1 wherein said one-way exit comprises a conduit comprising a plurality of inwardly projecting bristles positioned therein, which said bristles are angled downwardly in a direction away from said second opening.

3. The apparatus of claim 2 wherein said bristles are flexible and of a length and resilience effective to allow the passage of crawling adult bees in a downward direction away from said second opening while inhibiting the passage of bees moving in the opposite direction.

4. The apparatus of claim 3 wherein said bristles are of sufficient length such that the proximate ends thereof facing the interior of said conduit are approximately adjacent to one another.

5. The apparatus of claim 4 wherein the distal ends of said bristles extend sufficiently past each other to inhibit the ability of said bees to move in said opposite direction.

6. The apparatus of claim 2 wherein said conduit extends between said first opening and said second opening.

7. The apparatus of claim 1 wherein said heating element, power source, and controller are effective to heat and maintain said hollow interior chamber of said second container at about 20° C. to about 30° C.

8. The apparatus of claim 7 wherein said heating element, power source, and temperature controller are effective to heat and maintain said hollow interior chamber of said second container at about 21° C. to about 22° C.

9. The apparatus of claim 1 wherein said power source is selected from the group consisting of a battery, capacitor, and combinations thereof.

10. The apparatus of claim 9 further comprising a solar panel or wind powered generator in communication with and effective for charging said power source.

11. The apparatus of claim 1 wherein at least a portion of said second container adjacent to said heating element is constructed of a thermally conductive material.

12. The apparatus of claim 1 wherein at least one of said first container and said second container are constructed from a substantially opaque material effective for preventing light from accessing said bees in said hollow interior chamber of said second container except through said first opening, said second opening, and said one-way exit.

13. The apparatus of claim 1 wherein said first bottom surface is approximately horizontal and said first container further comprises a first opposed upper surface and a first closed side wall extending between said first bottom and first upper surfaces and enclosing said first interior chamber.

14. The apparatus of claim 13 wherein said second bottom surface is approximately horizontal and said second container further comprises a second opposed upper surface and a second closed side wall extending between said second bottom and second upper surfaces and enclosing said second interior chamber.

15. The apparatus of claim 14 wherein said first and second side walls have a horizontal cross section independently selected from the group consisting of a closed curve, polygon, quadrilateral, circle, ovoid, and an ellipse.

16. A method for providing for incubating and synchronizing the emergence of solitary-nesting, pollinating bees in the field comprising:
  A) providing one or more nests or cocoons of viable solitary pollinating bees in an apparatus for the incubation and emergence of solitary pollinating bees, which said apparatus comprises:
    a) a first openable/closable outer container comprising a hollow interior chamber and a bottom surface, said first bottom surface comprising a first opening therethrough, wherein said outer first container is constructed from a thermal insulating material;
    b) a second openable/closable inner container disposed within said hollow interior chamber of said first container, said second container comprising a hollow interior chamber and a second bottom surface, wherein said hollow interior chamber of said second container is effective for holding said nests or cocoons of solitary pollinating bees therein, and said second bottom surface comprises a second opening therethrough;
    c) a one-way exit attached to or extending through said first opening and in communication with said second opening to allow the egress of said bee from said hollow interior chamber of said second container to the environment while inhibiting the entrance of said bee into said hollow interior chamber of said second container from the environment;
    d) a heating element disposed within said hollow interior chamber of said first container and external of said second container effective for warming said nests or cocoons disposed within said hollow interior chamber of said second container;
    e) a temperature controller in communication with said heating element effective for controlling said heating element; and
    f) an electrical power source operably connected to said heating element effective for providing power thereto;
  B) placing said nests or cocoons of said viable solitary pollinating bees in said apparatus in the locus of a field or orchard wherein said conduit and said one-way exit are out of contact with the ground; and
  C) maintaining said nests or cocoons at a temperature conducive to the growth and emergence of bees within said nests or cocoons at least during a portion of the day or night.

17. The method of claim 16 wherein said bees comprise cavity nesting solitary bees of the genera selected from the group consisting of *Osmia, Megachile,* and *Xylocopa*.

18. The method of claim 17 wherein said bees are selected from the group consisting of the blue orchard bee, alfalfa leafcutting bee, horn faced bee, sunflower leafcutting bee, and blueberry bees.

19. The method of claim 16 wherein said temperature is between about 20° C. to about 30° C.

20. The method of claim 16 wherein said one-way exit comprises a conduit comprising a plurality of inwardly projecting bristles positioned therein, which said bristles are angled downwardly in a direction away from said second opening.

21. The method of claim 20 wherein said bristles are flexible and of a length and resilience effective to allow the passage of crawling adult bees in a downward direction away said second opening while inhibiting the passage of bees moving in the opposite direction.

22. The method of claim 21 wherein said bristles are of sufficient length that they cross at their distal ends.

23. The method of claim 16 wherein said nest is maintained at said temperature conducive to the growth and emergence of bees within said hive during a portion of the daylight or night-time hours.

* * * * *